US011811645B1

United States Patent
Reth

(10) Patent No.: US 11,811,645 B1
(45) Date of Patent: Nov. 7, 2023

(54) REQUEST ROUTING SYSTEM USING REINFORCEMENT LEARNING

(71) Applicant: Microsoft Technology Licensing, LLC, Redmond, WA (US)

(72) Inventor: Sarandeth Reth, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/831,572

(22) Filed: Jun. 3, 2022

(51) Int. Cl.
*H04L 45/02* (2022.01)
*G06N 20/00* (2019.01)
*H04L 61/4511* (2022.01)

(52) U.S. Cl.
CPC ............. *H04L 45/08* (2013.01); *G06N 20/00* (2019.01); *H04L 61/4511* (2022.05)

(58) Field of Classification Search
CPC ................................ H04L 45/08; G06N 20/00
See application file for complete search history.

(56) References Cited

U.S. PATENT DOCUMENTS

| 6,092,178 | A | * | 7/2000 | Jindal | H04L 67/101 |
| | | | | | 712/27 |
| 7,020,698 | B2 | * | 3/2006 | Andrews | H04L 67/101 |
| | | | | | 709/224 |
| 10,097,568 | B2 | | 10/2018 | Baughman et al. | |
| 11,063,881 | B1 | * | 7/2021 | Vijayasuganthan | G06N 20/00 |
| 11,310,119 | B2 | * | 4/2022 | Singh | H04L 45/74 |
| 2015/0332145 | A1 | * | 11/2015 | Vasseur | H04L 45/08 |
| | | | | | 706/12 |
| 2018/0367498 | A1 | | 12/2018 | Bliss et al. | |
| 2020/0267053 | A1 | | 8/2020 | Zheng et al. | |
| 2021/0073661 | A1 | * | 3/2021 | Matlick | G06N 20/00 |
| 2021/0075761 | A1 | | 3/2021 | Li et al. | |
| 2021/0112011 | A1 | * | 4/2021 | K S | H04L 45/08 |
| 2021/0351989 | A1 | * | 11/2021 | Toy | H04L 45/08 |
| 2022/0191142 | A1 | * | 6/2022 | Mermoud | H04L 45/08 |
| 2022/0377005 | A1 | * | 11/2022 | Vasseur | H04L 45/08 |
| 2023/0018628 | A1 | | 1/2023 | Garcarz et al. | |
| 2023/0113462 | A1 | * | 4/2023 | Sesha | H04L 45/08 |
| | | | | | 370/392 |

OTHER PUBLICATIONS

Bouzidi, et al., "Deep Reinforcement Learning Application for Network Latency Management in Software Defined Networks", In Proceedings of IEEE Global Communications Conference (GLOBECOM), Dec. 9, 2019, 7 Pages.

Dye, Nate, "Selecting Service Endpoints for Reliability and Performance", Retrieved from: https://aws.amazon.com/blogs/architecture/selecting-service-endpoints-for-reliability-and-performance/, Jun. 25, 2014, 6 Pages.

(Continued)

*Primary Examiner* — Nam T Tran
(74) *Attorney, Agent, or Firm* — Christopher J. Volkmann; Kelly, Holt & Christenson, PLLC

(57) ABSTRACT

A DNS service routes network traffic based on a routing policy. A DNS routing policy generation system receives latency data corresponding to a plurality of different users, and a learning system learns the routing policy based on the latency data. In learning the routing policy, the learning system waits latency samples so that more recent latency samples are weighted more heavily than less recent latency samples.

20 Claims, 8 Drawing Sheets

(56) References Cited

OTHER PUBLICATIONS

Jin, et al., "A Q-Learning-Based Delay-Aware Routing Algorithm to Extend the Lifetime of Underwater Sensor Networks", In Journal of Sensors, vol. 17, Issue 7, July T9, 2017, pp. 1-15.
Elsayed, et al., "Deep Reinforcement Learning for Reducing Latency in Mission Critical Services", In Proceedings of IEEE Global Communications Conference, Dec. 9, 2018, 6 Pages.
Mohammed, et al., "A Multimodal Deep Learning-Based Distributed Network Latency Measurement System", In Journal of IEEE Transactions on Instrumentation and Measurement, vol. 69, Issue 5, May 2020, pp. 2487-2494.
"International Search Report and Written Opinion Issued in PCT Application No. PCT/US23/018775", dated Jun. 7, 2023, 12 Pages.

\* cited by examiner

REQUEST ROUTING SYSTEM USING REINFORCEMENT LEARNING

BACKGROUND

Computing systems are currently in wide use. Some such computing systems include hosted systems that host applications or other services over a network. In some computing systems, client computing systems run browsers or other applications to access hosted applications or other sites. Users enter a domain name to navigate the browser to a desired site.

A domain name system (DNS) is responsible for servicing name resolution requests from users. A user computing system, for instance, may receive a user input identifying a domain name that the user wishes to navigate to. The domain name must be resolved to an internet protocol (IP) address so that the computing system can navigate the user to that IP address to access the desired site. A domain name system (DNS) can be accessed to resolve the domain name to an IP address. In order to obtain the IP address, the user computing system generates a DNS request which is provided to a DNS service. The DNS request contains a request to resolve a domain name into an IP address. The DNS service attempts to serve the DNS request by returning the IP address of the service endpoint that is closest to the user computing system in terms of latency (e.g., that responds to the user or user computing system with the lowest network latency of all the available service endpoints to which the user may be connected).

The DNS service resolves the domain name to an IP address and provides the IP address back to the user computing system. The IP address can then be used to navigate to the desired site (such as a website).

The discussion above is merely provided for general background information and is not intended to be used as an aid in determining the scope of the claimed subject matter.

SUMMARY

A DNS service routes network traffic based on a DNS routing policy. A DNS routing policy generation system receives latency data corresponding to a plurality of different users, and a learning system learns the routing policy based on the latency data. In learning the routing policy, the learning system weights latency samples so that more recent latency samples are weighted more heavily than less recent latency samples.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
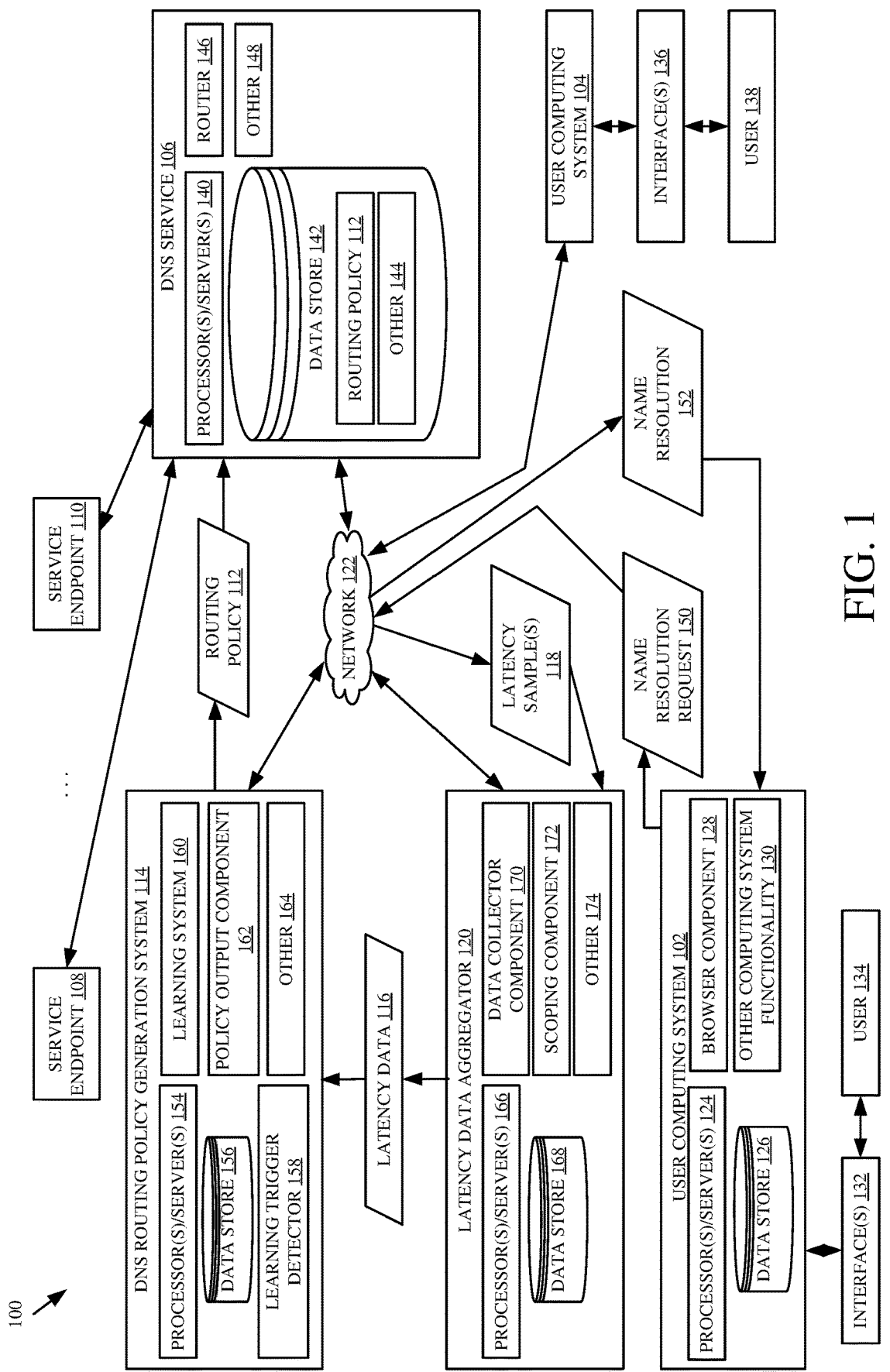
FIG. 1 is a block diagram of one example of a computing system architecture.

As discussed above, a DNS service receives a DNS request from a client or other computing system and the DNS service resolves the domain name in the DNS request to an IP address that can be used to navigate to a service endpoint hosting the application that the client wishes to access. The DNS service serves the DNS request by returning the IP address of the service endpoint. The DNS service attempts to serve the request by picking the service endpoint that is closest (in terms of network latency) to the requesting computing system. Even if the requesting computing system and a service endpoint are relatively close to one another geographically, this does not necessarily mean that they are close to one another in terms of network latency. For example, the requesting computing system may have a difficult time communicating with the service endpoint which is geographically close if the computing systems and the service endpoint belong to two different internet service providers that are many networking hops away from each other. A service endpoint that is geographically close to a requesting computing system may not be the closest in terms of network latency for other reasons as well.

Therefore, the DNS service attempts to serve the DNS requests using a routing policy that can be used to look up a closest service endpoint. For instance, in one example, the DNS service attempts to resolve the domain name in the DNS request to an IP address of a service endpoint that is closest to the requesting computing system in terms of the number of network hops that it will take to reach the service endpoint. However, this approach can present problems as well. For instance, having fewer network hops does not necessarily translate to having lower network latency. A single transcontinental hop, for instance, may take 100 milliseconds in network latency whereas five shorter hops may each incorporate only 5 milliseconds of network latency.

Another current approach for resolving domain names in DNS requests to IP addresses of service endpoints is to use a route map that maps each requesting computing system subnetwork to a list of service endpoints that are arranged in increasing order of median network latency computed using latency samples collected over a period of several weeks. This type of system has a number of different drawbacks. The system that generates the routing map weights every latency sample the same which means that latency samples collected from days or weeks ago can still greatly influence the current routing decision. Further, with such a long lookback period, this approach does not react quickly to changes in the network conditions and therefore does not reflect the current state of the network. Simply reducing the lookback period presents problems of its own. Such an approach often results in an insufficient volume of latency samples being collected from the requesting computing system subnetworks to result in the generation of a reliable routing map.

Therefore, the present discussion proceeds with respect to a system that uses a modified form of a model free reinforcement learning algorithm (such as a modified Q-learning algorithm) to address the issues of using latency samples acquired over a relatively large look back period (e.g., a time period in the past). The present discussion also addresses the issue of having an insufficient volume of latency samples. The present system uses a learning system that generates a routing policy that maps the requesting computing system subnetworks to different service endpoints using the Q-learning algorithm which weights more recent latency samples higher than less recent latency samples. In one example, the weight of the latency samples degrades over time so that, as time passes since the latency sample was collected, its weight decreases and eventually approaches 0. The present description also proceeds with respect to a system which assigns a high latency value to a new service endpoint that is employed in the computing system architecture. This results in DNS requests being preferentially resolved to IP addresses of other service endpoints until the DNS routing policy reflects a relatively accurate latency value for the new service endpoint.

FIG. 1 is a block diagram of one example of a computing system architecture 100 in which a plurality of user computing systems 102-104 provide DNS requests to a DNS service 106 which, itself, resolves each of those requests by returning an IP address of a service endpoint out of a plurality of different service endpoints 108-110. In serving the DNS requests, DNS service 106 uses a routing policy 112 to pick the closest service endpoint to the requesting computing system, and the routing policy is generated by a DNS routing policy generation system 114. In generating the routing policy 112, DNS routing policy generation system 114 uses latency data 116 that is aggregated from a number of latency samples 118 by latency data aggregator 120. The latency samples 118 may be aggregated from latency data that is reported by, or acquired from, user computing systems 102-104.

The various items in architecture 100 may communicate over network 122. Therefore, network 122 can be a wide area network, a local area network, a near field communication network, a cellular network, or any of a wide variety of other networks or combinations of networks. Before describing the operation of computing system architecture 100 in more detail, a description of some of the items in architecture 100, and their operation, will first be provided.

User computing systems 102-104 may be or similar or different. For purposes of the present discussion, it will be assumed that there they are similar so that only user computing system 102 is described in more detail. In the example shown in FIG. 1, user computing system 102 includes one or more processors or servers 124, data store 126, browser component 128, and other computing system functionality 130. User computing system 102 is also shown generating interface(s) 132 for interaction by user 134. User 134 interacts with interface(s) 132 in order to control and manipulate user computing system 102 and possibly other portions of architecture 100. FIG. 1 also shows that user computing system 104 generates interface(s) 136 for interaction by user 138. User 138 can interact with interface(s) 136 in order to control and manipulate user computing system 104 and some other portions of architecture 100.

DNS service 106 illustratively includes one or more processors or servers 140, data store 142 (which may store routing policy 112 and other items 144), router 146, and other items 148. When one of the user computing systems 102-104 needs to have a domain name resolved to its corresponding IP address, the user computing system generates a name resolution request. For purposes of the present discussion, it will be assumed that user computing system 102 generates a name resolution request 150. Request 150 is provided to DNS service 106. Router 146 attempts to serve the name resolution request 150 by returning an IP address of a service endpoint 108-110 that is closest to user computing system 102 in terms of network latency. In order to serve the name resolution request, router 146 illustratively accesses the routing policy 112 which maps different client computing system subnetworks (i.e., it is assumed that user computing system 102 belongs to one of those subnetworks) to a service endpoint 108-110 that is closest to that subnetwork in terms of latency. Therefore, router 146 identifies the client subnetwork that name resolution request 150 originated from and accesses routing policy 112 to identify the service endpoint 108-110 that is closest, in terms of network latency, to the identified client subnetwork. Router 146 then returns the IP address that can be used to navigate to the identified service endpoint 108-110.

DNS routing policy generation system 114 may include one or more processors or servers 154, data store 156, learning trigger detector 158, learning system 160, policy output component 162, and other items 164. Learning trigger detector 158 may detect when it is time for learning system 160 to perform learning in order to generate a new or modified routing policy 112 for DNS service 106. In one example, learning trigger detector 158 may detect an input from DNS service 106 (or elsewhere) requesting an updated routing policy 112, as the trigger to perform learning. In another example, learning trigger detector 158 may detect that a triggering time period has elapsed since policy 112 was last generated or modified so that learning system 160 is to learn a modified routing policy 112. In yet another example, it may be that a threshold number or volume of latency data samples have been collected and that is used as the trigger to control learning system 160 to perform learning.

Once triggered, learning system 160 performs learning based on latency data 116 that is received from latency data aggregator 120, in order to generate routing policy 112. In the example described herein, learning system 160 uses a variant of the Q-learning algorithm (which is a model free reinforcement learning algorithm) illustrated by equation 1 below:

$$Q(s,\alpha) \leftarrow (1-\alpha)Q(s,\alpha) + (\alpha)\text{sample} \qquad \text{EQ. 1}$$

Equation 1 illustrates how a rational artificial intelligence (AI) agent optimally picks the best action that maximizes its utility for a given state. The utility is represented by Q, the given state is represented by s and the action is indicated by $\alpha$. The goal of router 146, by contrast, is to pick the best service endpoint 108-110 for a requesting computing system (e.g., user computing system 102) in order to minimize delay and thus optimize user experience. For EQ. 1 the context of DNS routing, then, the state s corresponds to a client subnetwork while the action $\alpha$ corresponds to the task of routing users from that client subnetwork to a specific service endpoint 108-110. The utility Q corresponds to the negative of the average latency from a client subnetwork to a specific service endpoint 108-110. The sample from EQ. 1 is represented in EQ. 2 below:

$$\text{sample} = R(s, a, s') + \gamma \max_{a'} Q(s', a') \qquad \text{Q. 2}$$

In a conventional Q-learning algorithm, each sample is the sum of the intermediate reward R for taking action a at state s and the maximum discounted utility Q that can be achieved by taking some action α' at the next state s'. In the context of DNS routing, there is no next state s' since there is no action that the DNS service 106 needs to take once it resolves the name resolution request 150 to a specific IP address of a service endpoint 108-110. Therefore, each sample is simply the intermediate reward R for taking action α at state s which is the negative of the latency from an end user, or end user subnetwork, to a specific service endpoint 108-110.

Because maximizing the utility Q is the same as minimizing the average network latency, the routing policy 112 produced by learning system 160 will result in routing end users to the closest service endpoint 108-110 in terms of network latency, yet provide the DNS service 106 with full control over which service endpoint 108-110 a client is connected to. Further, using this algorithm, learning system 160 does not suffer from insufficient data samples since the lookback period is not truncated to unduly limit the amount of data that learning system 160 can learn from. Instead, learning system 160 modifies the Q-learning algorithm to give higher weight to newer samples, as shown below in Equations 3, 4, and 5 below which allows routing policy 112 to be generated to reflect near real time network conditions and also allows the learning system 160 to react quickly to changes in those conditions. For instance, if there is a change in peering between two internet service providers such that a service endpoint 108-110 is no longer the closest endpoint to a specific user computing system or user computing system subnetwork, then the routing policy 112 reflects that change very quickly.

$$Q_k(s,\alpha) \leftarrow (1-\alpha)Q_{k-1}(s,\alpha) + (\alpha)\text{sample}_k \qquad \text{EQ. 3}$$

$$Q_k(s,\alpha) \leftarrow (1-\alpha)^2 Q_{k-2}(s,\alpha) + (1-\alpha)(\alpha)\text{sample}_{k-1} + (\alpha)\text{sample}_k \qquad \text{EQ. 4}$$

$$Q_k(s,\alpha) \leftarrow (\alpha)[(1-\alpha)^{k-1}\text{sample}_1 + (1-\alpha)^{k-2}\text{sample}_2 + \ldots + \text{sample}_k] \qquad \text{EQ. 5}$$

In Equations 3-5, k represents a current average latency while k−1 represents a previous average latency. Therefore, the rate at which Q-learning system 160 reacts to changes in network conditions can be controlled by the hyper parameter α, which can be tuned over time. For a given value of α, the Q-learning algorithm employed by learning system 160 can be thought of as approximately averaging latency over the last $1/\alpha$ samples since the weight of the sample decays to a negligible value after these $1/\alpha$ samples. For instance, as the value of k becomes larger, the coefficient applied to earlier-obtained samples decreases. As new samples are encountered, the coefficient of the older samples gets smaller and converge to 0. Thus, the moving average latency value used in Equation 5 depends most significantly on the more recent latency values. It is less affected by older latency values and eventually the affect of the older latency values becomes negligible.

Referring again to FIG. 1, latency data aggregator 120 can include one or more processors or servers 166, data store 168, data collector component 170, scoping component 172, and other items 174. Latency data aggregator 120 aggregates the latency data samples 116 from user computing systems 102-104 or user computing system subnetworks. Data collector component 170 aggregates the latency samples 118 and scoping component 172 can further aggregate them based on user scoping parameters. For instance, it may be that the latency samples 118 may be aggregated over a geographic area scope of users, or samples 118 may be aggregated over autonomous system numbers to which users belong, or in other ways. Thus, the average latency of a set of latency samples 118 may be aggregated based on the user scoping parameters by scoping component 172.

Figure 2:
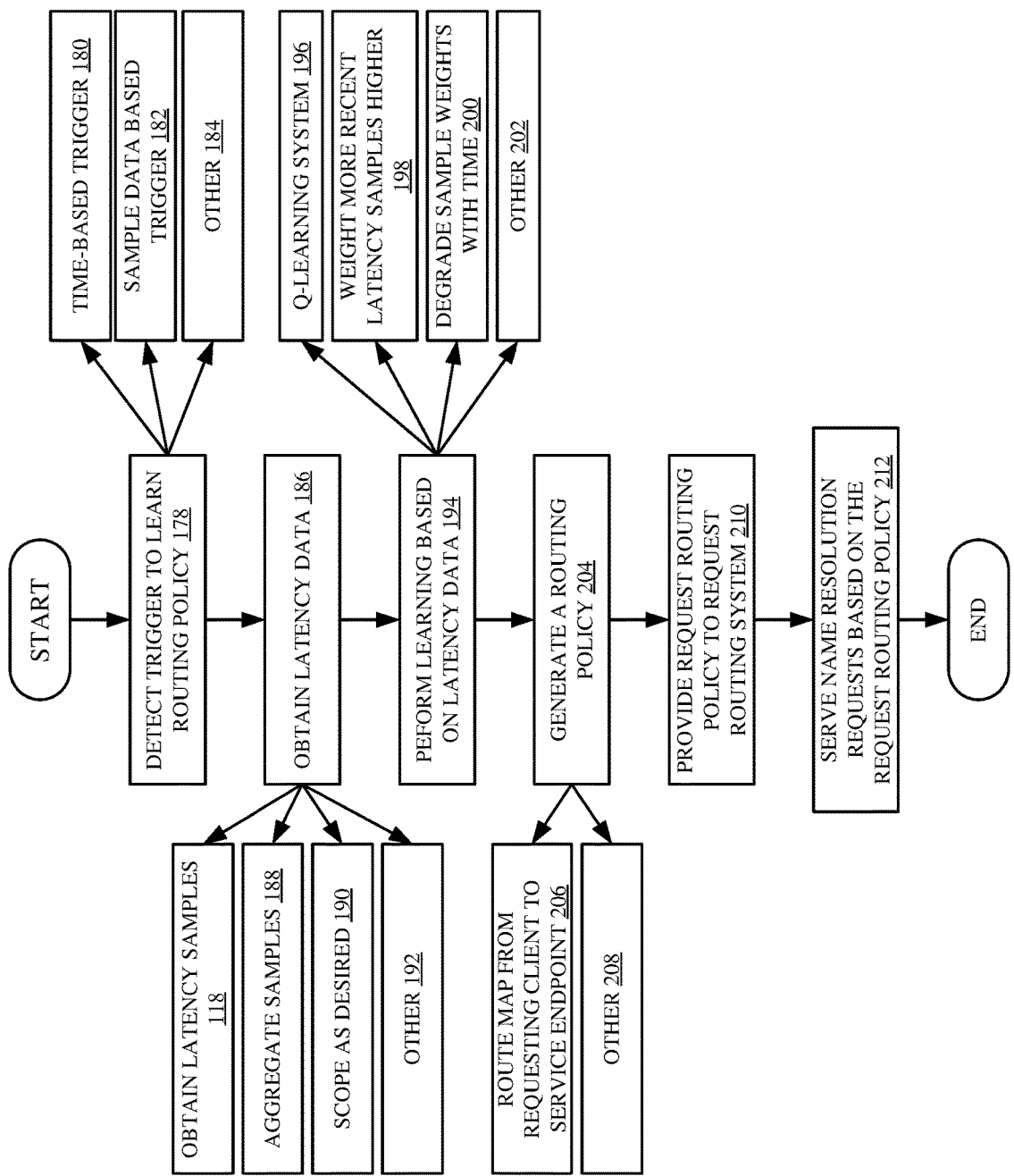
FIG. 2 is a flow diagram illustrating one example of the operation of a computing system architecture.

FIG. 2 is a flow diagram illustrating one example of the operation of computing system architecture 100. At some point, learning trigger detector 158 detects a trigger indicating that learning system 160 is to learn or generate a routing policy 112 based upon latency data 116. Detecting the trigger to perform learning is indicated by block 178 in the flow diagram of FIG. 2. As discussed above, the trigger can be a time-based trigger 180, a sample data volume based trigger 182, or another trigger 184. Learning system 160 then obtains latency data 116, as indicated by block 186 in the flow diagram of FIG. 2. The latency data can be latency samples 118 or, aggregated samples 188. The samples can be scoped, as desired, as indicated by block 190. The latency data can be obtained in other ways as well, as indicated by block 192.

Learning system 160 then performs learning based on the latency data, as indicated by block 194. As discussed above, learning system 160 can implement a model-free reinforcement learning algorithm such as a modified Q-learning system 196 where more recent latency samples are weighted higher than less recent latency samples, as indicated by block 198 in the flow diagram of FIG. 2. In one example, the Q-learning system degrades the sample weights with time, as indicated by block 200. The learning can be performed in other ways as well, as indicated by block 202.

Learning system 160 generates a routing policy 112 which is output by policy output component 162, as indicated by block 204 in the flow diagram of FIG. 2. The routing policy 112 can be a route map from the requesting client computing systems (or user computing systems or user computing system subnetworks) to a service endpoint 108-110, as indicated by block 206. The routing policy can be generated and output in other ways as well, as indicated by block 208. Policy output component 162 then provides the routing policy 112 to DNS service 106, as indicated by block 210 in the flow diagram of FIG. 2. Router 146 in DNS service 106 then serves name resolution requests from user computing systems 102-104 by resolving the domain names in the requests to IP addresses of the service endpoints 108-110 using the routing policy 112, as indicated by block 212 in the flow diagram of FIG. 2. This continues until trigger detector 158 detects that it is time to update the routing policy 112, at which time processing continues at block 186.

Figure 3:
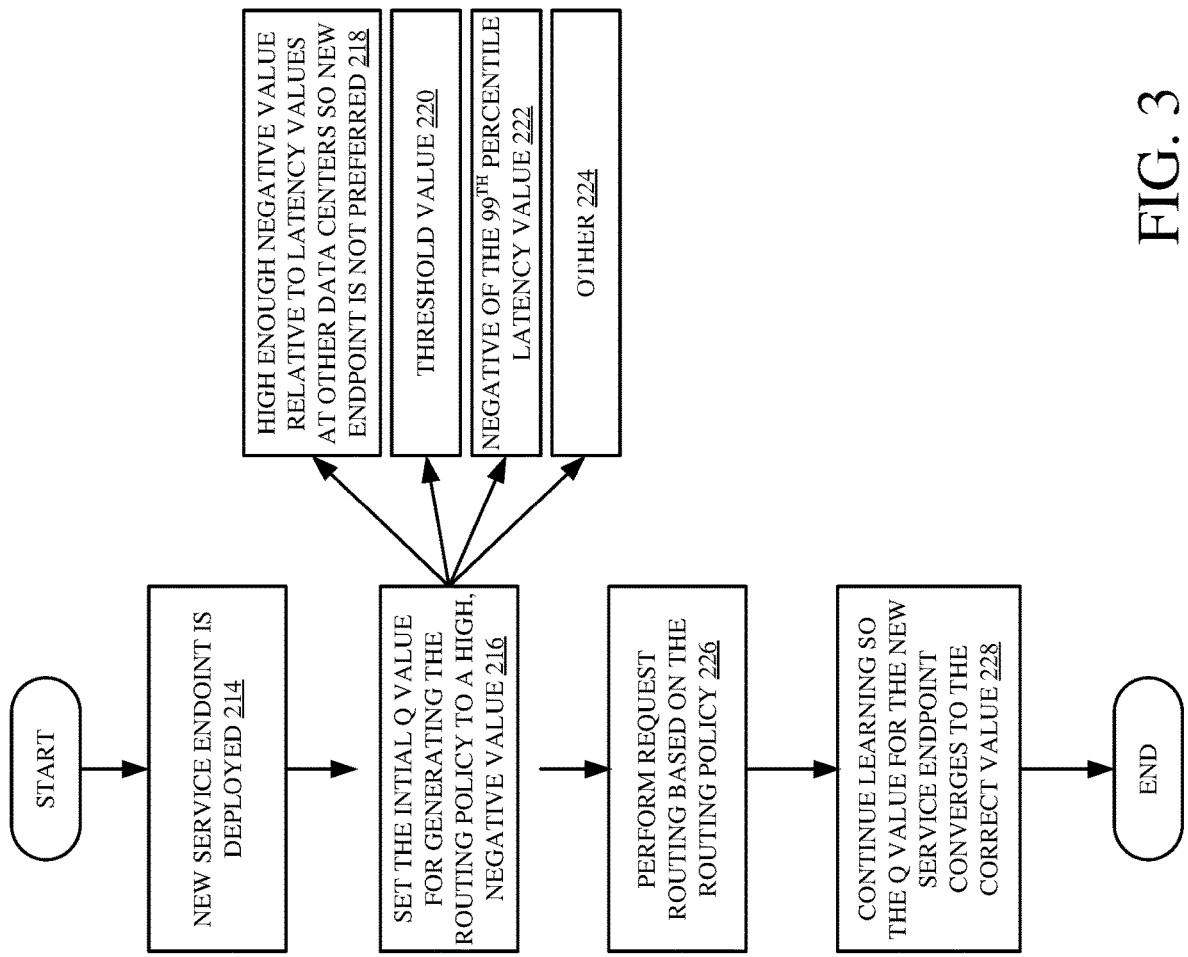
FIG. 3 is a flow diagram illustrating one example of the operation of a computing system architecture when a new service endpoint is deployed in the computing system architecture.

FIG. 3 is a flow diagram illustrating the operation of learning system 160 in generating a routing policy 112 incorporating a newly deployed service endpoint. In current forms of the Q-learning algorithm, where the starting value of Q ($Q_0$) is set to 0, there is a high bias when the AI agent first learns a new state-action pair. This is because for the first few samples, the Q-learning algorithm greatly underestimates the average Q value, and this problem only resolves itself when the AI agent has learned from enough numbers of samples that it approaches the accurate value for Q. For example, assume that α=0.01 and every sample is 100. The Q-learning algorithm would thus estimate $Q_1=0.99\times Q_0+0.01\times \text{sample}_1=1$ and $Q_2=0.99\times Q_1+0.01\times \text{sample}_2=0.99+1=1.99$. This is significantly below the actual average Q-value which is 100. $Q_k$ only converges to 100 when k is high enough.

In the context of DNS routing, when a new service endpoint is deployed, there are very few latency samples associated with the newly deployed service endpoint. As a result, learning system 160 incorrectly estimates the Q value of this service endpoint to be close to 0, making the new service endpoint seem like the most optimal service endpoint, with the lowest latency. However, this can result in serious availability issues because it would mean that whenever a new service endpoint is deployed, the routing policy 112 would incorrectly route substantially all network traffic to this newly deployed service endpoint, causing most service requests to fail.

In order to address this problem, one current mechanism is to use bias correction which divides the $Q_k$ value by $1-(1-\alpha)^k$ to get the correct average Q value. However, this approach requires the learning system 110 to keep track of the number of samples k that have been seen for each state-action pair. Further, computation becomes very expensive as the value of k grows.

Therefore, in order to address these issues, the present discussion proceeds with respect to learning system 160 setting the initial Q value to a high, but negative number so that the newly deployed DNS service endpoint is not preferred until the Q-value converges more closely to its correct value. This means that network traffic will not be preferentially routed to the new service endpoint until the routing policy 112 is generated using a sufficient number of latency samples to more accurately estimate the Q value corresponding to the newly deployed service endpoint.

In one example, the initial Q value may be set to-(latency at the $99^{th}$ percentile). With respect to FIG. 3, assume that a new service endpoint is deployed, as indicated by block 214. Then, learning system 160 sets the initial Q value for generating the routing policy to a high, negative value, as indicated by block 216. In one example, the value is set to a high enough negative value relative to latency values at other data centers so that the new service endpoint is not preferred, as indicated by block 218. The high negative value may be a threshold that is set based on average latency values for other service endpoints, as indicated by block 220. In one example, the high negative value is set to a negative of the $99^{th}$ percentile latency value for other service endpoints, as indicated by block 222. The initial Q value can be set to other values as well, as indicated by block 224.

Leaning system 160 then generates the routing policy 112 based upon that initial Q value for the newly deployed service endpoint and provides the routing policy 112 to DNS service 106, which serves name resolution requests based upon the request routing policy 112 as indicated by block 226 in the flow diagram of FIG. 3. Learning system 160 continues learning so that the Q value for the newly deployed service endpoint converges to the correct value, as indicated by block 228.

It can thus be seen that the present description describes a system which learns a routing policy using a variant of a model-free reinforcement algorithm such as the Q-learning algorithm. The variant weights latency samples so that the affect of the latency samples on the Q value degrade over time. This allows the system to have sufficient latency samples so that the routing policy 112 can be accurately generated and learned by learning system 160 yet the routing policy 112 more accurately reflects the current conditions of the network and can more quickly respond to changing network conditions. The present system also allows the DNS service 106 to maintain control over which service endpoints the requests are resolved to and accommodates the addition of new service endpoints.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, the mechanisms can be actuated using touch gestures. Also, where the device that displays them has speech recognition components, they can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
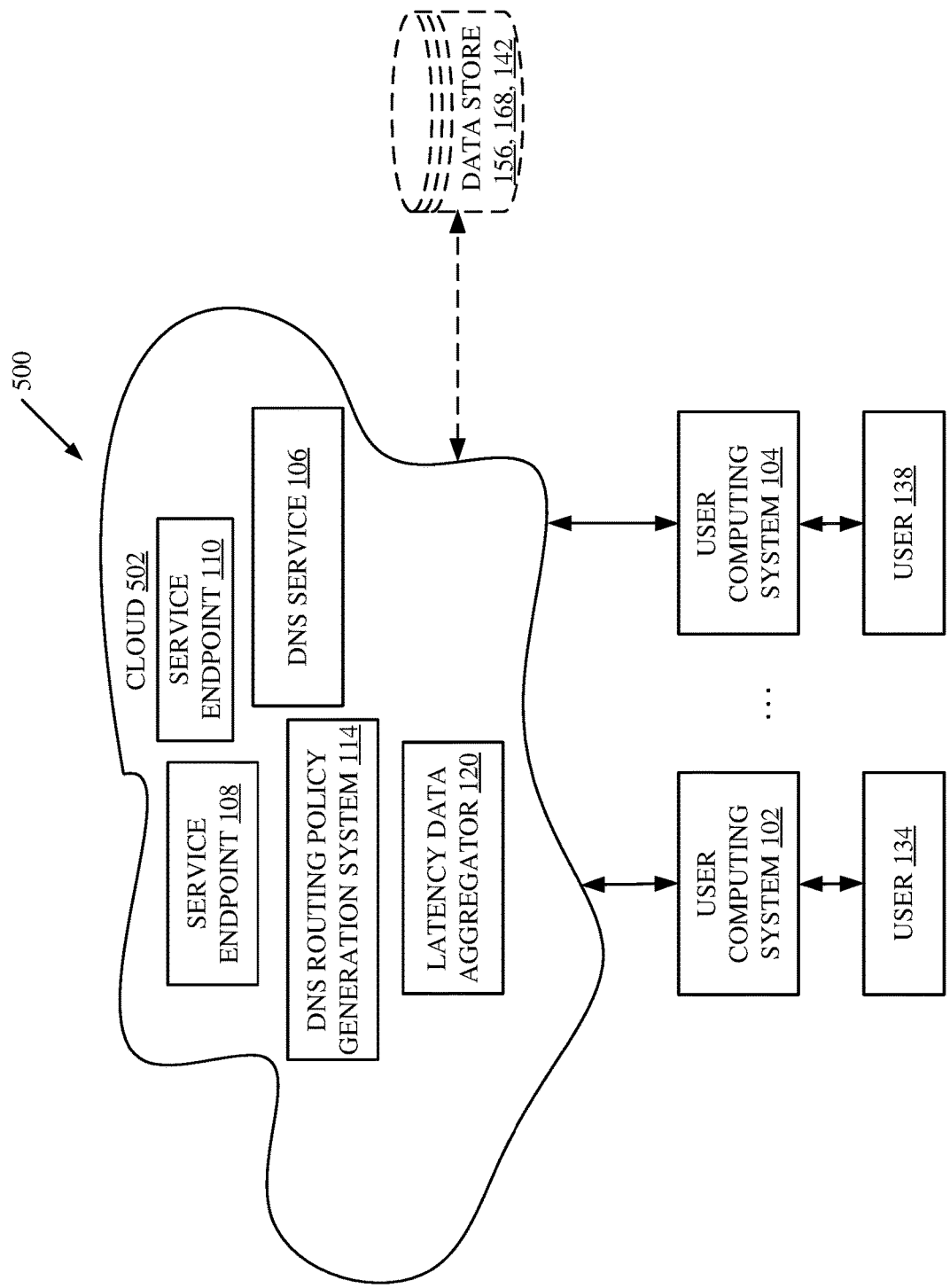
FIG. 4 is a block diagram showing one example of the computing system architecture illustrated in FIG. 1, deployed in a remote server architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, the components and functions can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that aggregator 120, service 106 and system 114, and/or service endpoints 108-110 can be located in cloud 502 (which can be public, private, or a combination where portions are public while others are private). Therefore, users 134-138 use user devices with computing systems 102-104 to access those systems through cloud 502.

FIG. 4 also depicts another example of a cloud architecture. It is also contemplated that some elements of computing system architecture 100 can be disposed in cloud 502 while others are not. Regardless of where they are located, the elements can be accessed directly by systems 102, 104, through a network (either a wide area network or a local area network), the elements can be hosted at a remote site by a service, or the elements can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
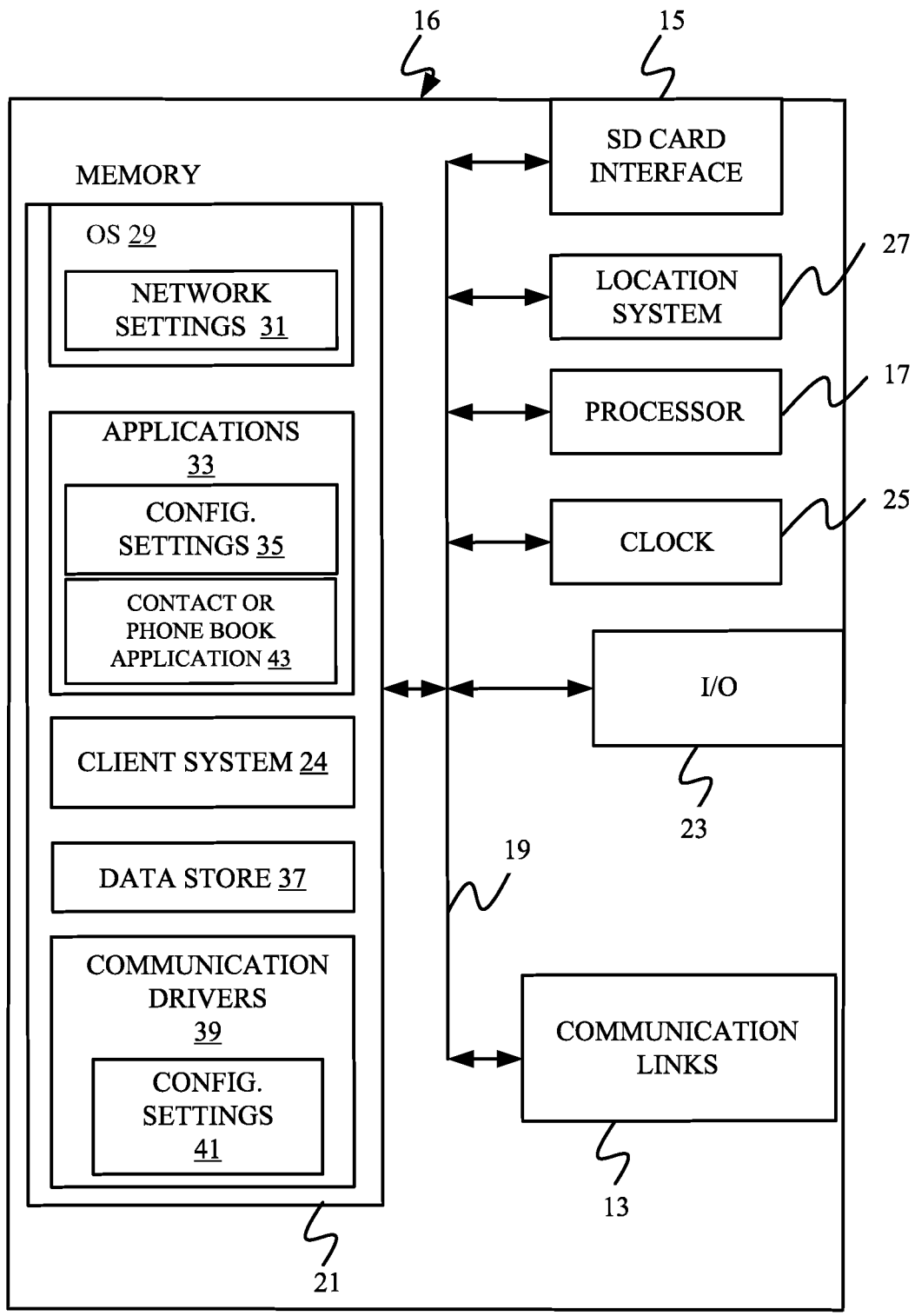
FIGS. 5, 6, and 7 show examples of mobile devices that can be used in a computing system architecture.
Figure 6:
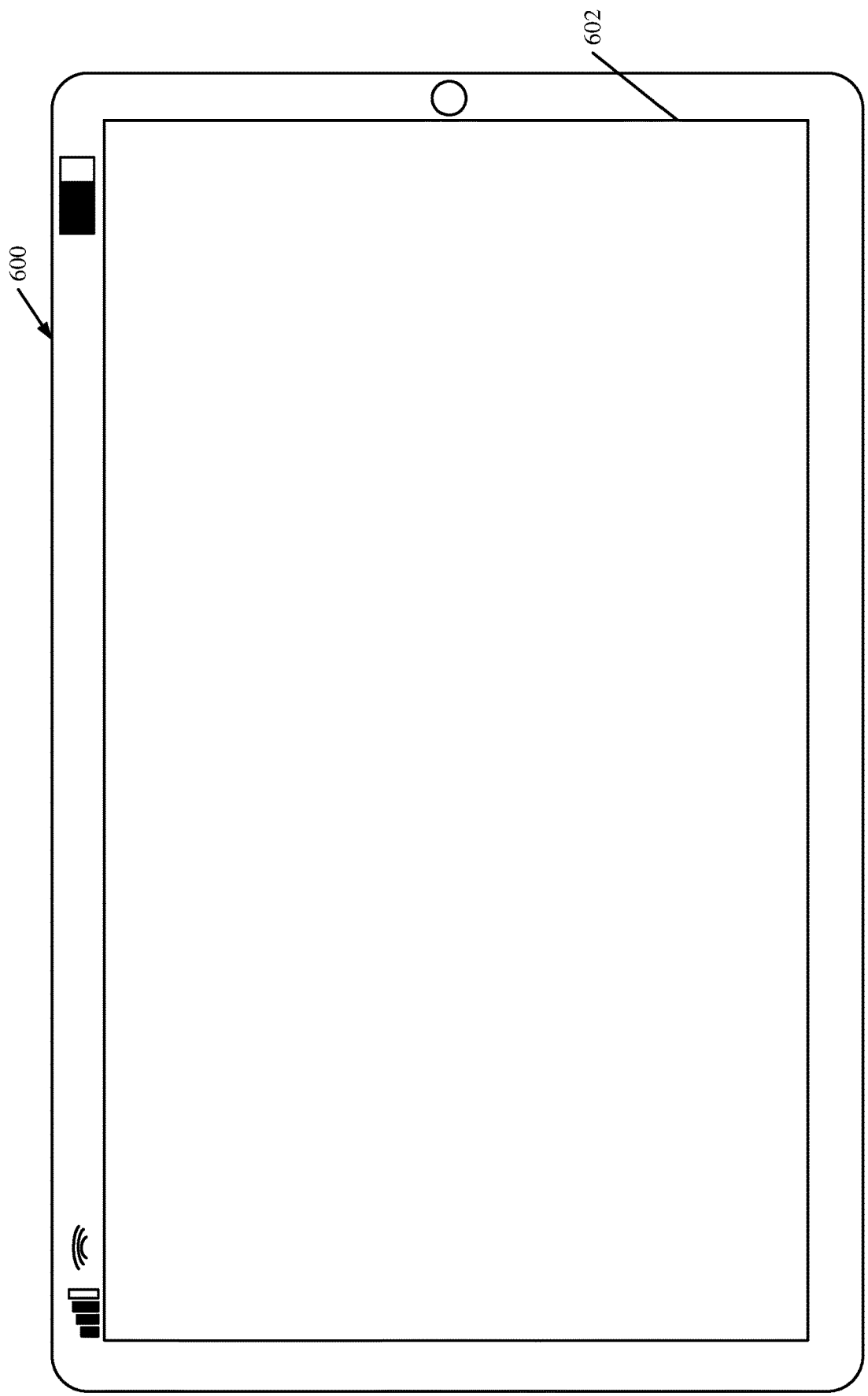
Figure 7:
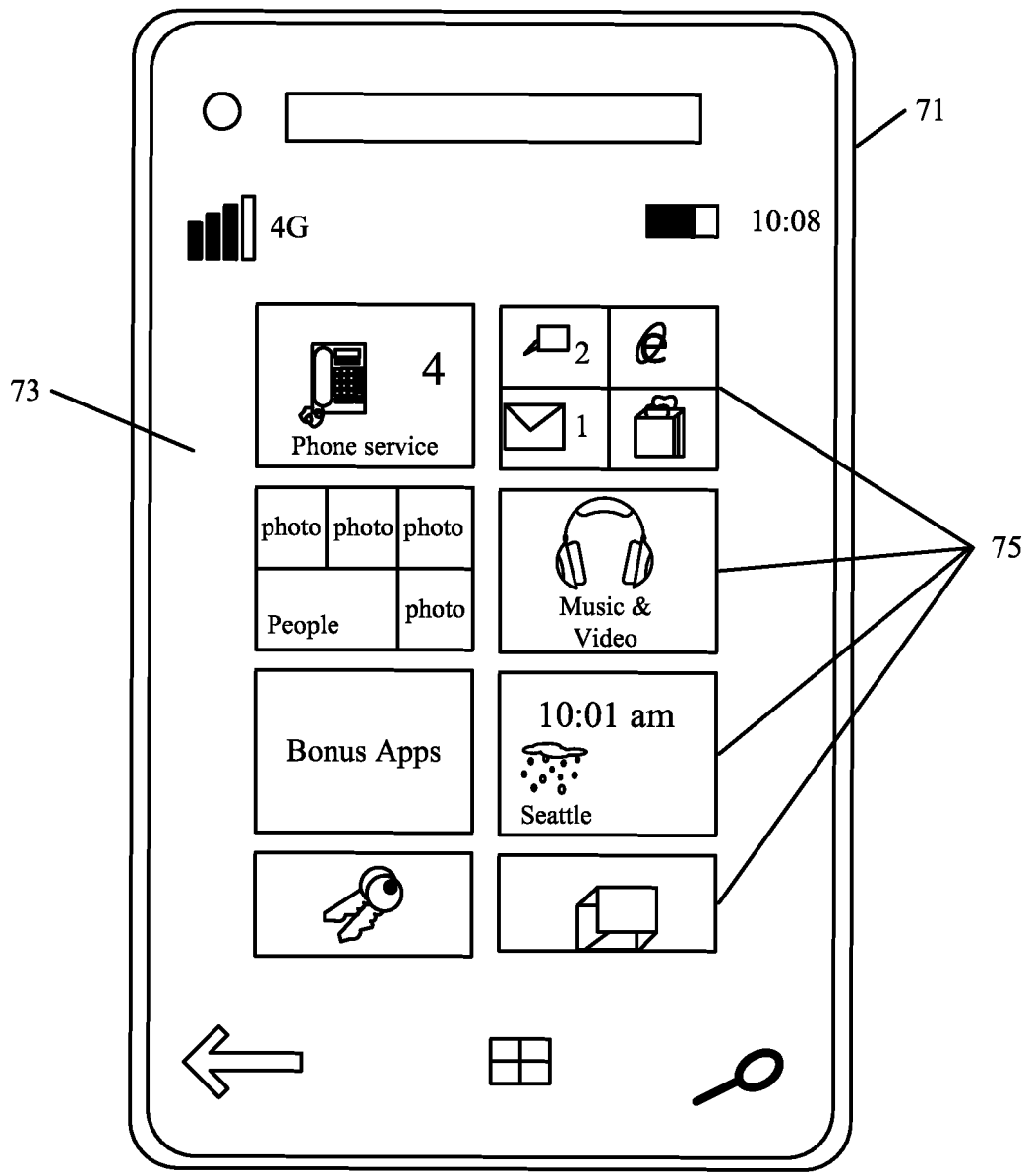

FIG. 5 is a simplified block diagram of one illustrative example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. System 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
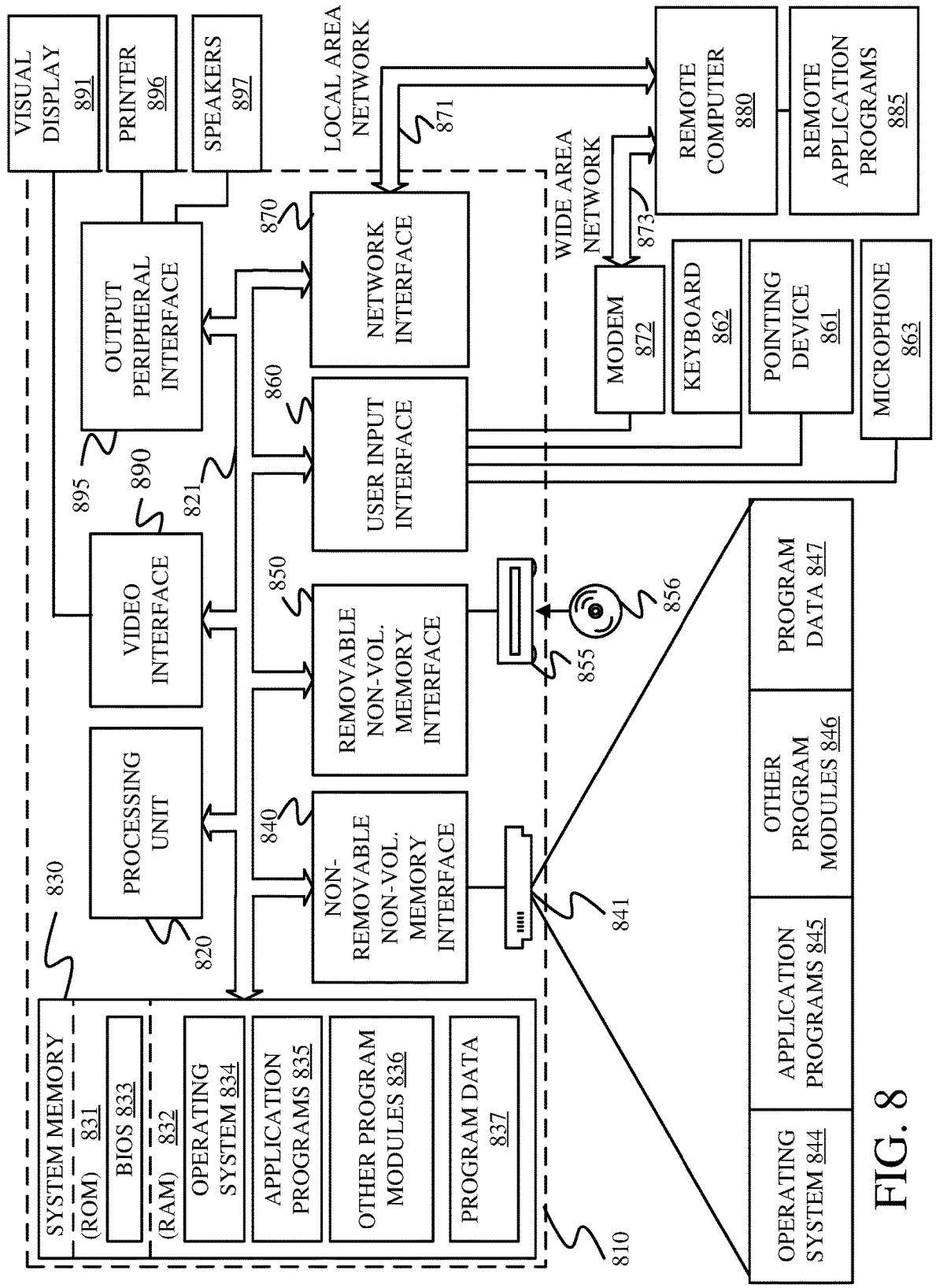
FIG. 8 is a block diagram showing one example of a computing environment.

FIG. 8 is one example of a computing environment in which architecture 100, or parts of it, (for example) can be deployed. With reference to FIG. 8, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are example and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer system, comprising:
at least one processor; and
a memory storing computer executable instructions which, when executed by the at least one processor, cause the at least one processor to perform steps comprising:
performing a learning operation to generate a routing policy based on a set of latency data indicative of latency, corresponding to service requests, encountered at client computing systems, the set of latency data including more recent latency data and less recent latency data, the set of latency data being weighted in the learning operation to obtain weighted latency data so higher weights are assigned to the more recent latency samples and lower weights are assigned to the less recent latency samples;
receiving a DNS request;
accessing the routing policy; and
serving the DNS request by returning an internet protocol (IP) address of a service endpoint based on the routing policy.

Example 2 is the computer system of any or all previous examples wherein performing a learning operation to generate a request routing policy comprises:
performing the learning operation to generate the routing policy as a routing map that maps client computing systems to service endpoints.

Example 3 is the computer system of any or all previous examples wherein performing a learning operation comprises:
computing a model free reinforcement learning algorithm (Q-learning algorithm) using the weighted latency data, to obtain Q-values for each pair of client computing systems and service endpoints; and
generating the routing map based on the Q-values.

Example 4 is the computer system of any or all previous examples wherein the computer executable instructions, when executed by the at least one processor, cause the at least one processor to perform steps further comprising:
detecting deployment of a new service endpoint; and
computing the Q-learning algorithm for the new service endpoint.

Example 5 is the computer system of any or all previous examples wherein computing the Q-learning algorithm for the new service endpoint comprises:

identifying a threshold latency value based on latencies corresponding to service endpoints, other than the new service endpoint; and
setting an initial Q-value for the new service endpoint based on the threshold latency value.

Example 6 is the computer system of any or all previous examples wherein computing the Q-learning algorithm for the new service endpoint comprises:
computing the Q-learning algorithm using the initial Q-value set for the new service endpoint.

Example 7 is the computer system of any or all previous examples wherein the computer executable instructions, when executed by the at least one processor, cause the at least one processor to perform steps further comprising:
obtaining the set of latency data.

Example 8 is the computer system of any or all previous examples wherein obtaining the set of latency data comprises:
receiving latency samples indicative of latency encountered at the client computing systems; and
aggregating the latency samples to generate the set of latency data.

Example 9 is the computer system of any or all previous examples wherein aggregating the latency samples comprises:
scoping the aggregated latency samples based on a user scope to obtain scoped, aggregated latency samples; and
generating the set of latency data based on the scoped, aggregated latency samples.

Example 10 is the computer system of any or all previous examples wherein performing a learning operation comprises:
detecting a learning trigger; and
performing the learning operation based on the detected learning trigger.

Example 11 is the computer system of any or all previous examples wherein detecting a learning trigger comprises at least one of:
detecting the learning trigger based on a time-lapse since a last learning operation was performed; or
detecting the learning trigger based on a volume of latency data received since a last learning operation was performed.

Example 12 is a computer implemented method, comprising:
performing a learning operation to generate a routing policy based on a set of latency data indicative of latency, corresponding to service requests, encountered at client computing systems, the set of latency data including more recent latency data and less recent latency data, the set of latency data being weighted in the learning operation to obtain weighted latency data so higher weights are assigned to the more recent latency samples and lower weights are assigned to the less recent latency samples;
receiving a DNS request;
accessing the routing policy; and
serving the DNS request by returning an internet protocol (IP) address of a service endpoint based on the routing policy.

Example 13 is the computer implemented method of any or all previous examples wherein performing a learning operation to generate a request routing policy comprises:
performing the learning operation to generate the routing policy as a routing map that maps client computing systems to service endpoints.

Example 14 is the computer implemented method of any or all previous examples wherein performing a learning operation comprises:
  computing a model free reinforcement learning algorithm (Q-learning algorithm) using the weighted latency data, to obtain Q-values for each pair of client computing systems and service endpoints; and
  generating the routing map based on the Q-values.

Example 15 is the computer implemented method of any or all previous examples and further comprising:
  detecting deployment of a new service endpoint; and
  computing the Q-learning algorithm for the new service endpoint.

Example 16 is the computer implemented method of any or all previous examples wherein computing the Q-learning algorithm for the new service endpoint comprises:
  identifying a threshold latency value based on latencies corresponding to service endpoints, other than the new service endpoint; and
  setting an initial Q-value for the new service endpoint based on the threshold latency value.

Example 17 is the computer implemented method of any or all previous examples wherein computing the Q-learning algorithm for the new service endpoint comprises:
  computing the Q-learning algorithm using the initial Q-value set for the new service endpoint.

Example 18 is the computer implemented method of any or all previous examples further comprising:
  receiving latency samples indicative of latency encountered at the client computing systems; and
  aggregating the latency samples to generate the set of latency data.

Example 19 is a computer system, comprising
  at least one processor; and
  a memory storing computer executable instructions which, when executed by the at least one processor, cause the at least one processor to implement:
    a learning system configured to perform a learning operation to generate a routing policy based on a set of latency data indicative of latency, corresponding to service requests, encountered at client computing systems, the set of latency data including more recent latency data and less recent latency data, the set of latency data being weighted in the learning operation to obtain weighted latency data so higher weights are assigned to the more recent latency samples and lower weights are assigned to the less recent latency samples; and
    a router configured to receive a DNS request, access the routing policy, and serve the DNS request by returning an internet protocol (IP) address of a service endpoint based on the routing policy.

Example 20 is the computer system of any or all previous examples wherein the learning system is configured to perform the learning operation by computing a model free reinforcement learning algorithm (Q-learning algorithm) using the weighted latency data, to obtain Q-values for each pair of client computing systems and service endpoints, and generate, as the routing policy, a routing map based on the Q-values.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:
  at least one processor; and
  a memory storing computer executable instructions which, when executed by the at least one processor, cause the at least one processor to perform steps comprising:
    performing a learning operation to generate a routing policy based on a set of latency data indicative of latency, corresponding to service requests, encountered at client computing systems, the set of latency data including more recent latency data and less recent latency data, the set of latency data being weighted in the learning operation to obtain weighted latency data so higher weights are assigned to the more recent latency data and lower weights are assigned to the less recent latency data;
    receiving a DNS request;
    accessing the routing policy; and
    serving the DNS request by returning an internet protocol (IP) address of a service endpoint based on the routing policy.

2. The computer system of claim 1 wherein performing a learning operation to generate a routing policy comprises:
  performing the learning operation to generate the routing policy as a routing map that maps client computing systems to service endpoints.

3. The computer system of claim 2 wherein performing a learning operation comprises:
  computing a model free reinforcement learning algorithm (Q-learning algorithm) using the weighted latency data, to obtain Q-values for each pair of client computing systems and service endpoints; and
  generating the routing map based on the Q-values.

4. The computer system of claim 3 wherein the computer executable instructions, when executed by the at least one processor, cause the at least one processor to perform steps further comprising:
  detecting deployment of a new service endpoint; and
  computing the Q-learning algorithm for the new service endpoint.

5. The computer system of claim 4 wherein computing the Q-learning algorithm for the new service endpoint comprises:
  identifying a threshold latency value based on latencies corresponding to service endpoints, other than the new service endpoint; and
  setting an initial Q-value for the new service endpoint based on the threshold latency value.

6. The computer system of claim 5 wherein computing the Q-learning algorithm for the new service endpoint comprises:
  computing the Q-learning algorithm using the initial Q-value set for the new service endpoint.

7. The computer system of claim 2 wherein the computer executable instructions, when executed by the at least one processor, cause the at least one processor to perform steps further comprising:
  obtaining the set of latency data.

8. The computer system of claim 7 wherein obtaining the set of latency data comprises:
  receiving latency samples indicative of latency encountered at the client computing systems; and
  aggregating the latency samples to generate the set of latency data.

9. The computer system of claim 8 wherein aggregating the latency samples comprises:
   scoping the latency samples based on a user scope to obtain scoped, aggregated latency samples; and
   generating the set of latency data based on the scoped, aggregated latency samples.

10. The computer system of claim 1 wherein performing a learning operation comprises:
   detecting a learning trigger; and
   performing the learning operation based on the learning trigger.

11. The computer system of claim 10 wherein detecting a learning trigger comprises at least one of:
   detecting the learning trigger based on a time-lapse since a last learning operation was performed; or
   detecting the learning trigger based on a volume of latency data received since a last learning operation was performed.

12. A computer implemented method, comprising:
   performing a learning operation to generate a routing policy based on a set of latency data indicative of latency, corresponding to service requests, encountered at client computing systems, the set of latency data including more recent latency data and less recent latency data, the set of latency data being weighted in the learning operation to obtain weighted latency data so higher weights are assigned to the more recent latency data and lower weights are assigned to the less recent latency data;
   receiving a DNS request;
   accessing the routing policy; and
   serving the DNS request by returning an internet protocol (IP) address of a service endpoint based on the routing policy.

13. The computer implemented method of claim 12 wherein performing a learning operation to generate a routing policy comprises:
   performing the learning operation to generate the routing policy as a routing map that maps client computing systems to service endpoints.

14. The computer implemented method of claim 13 wherein performing a learning operation comprises:
   computing a model free reinforcement learning algorithm (Q-learning algorithm) using the weighted latency data, to obtain Q-values for each pair of client computing systems and service endpoints; and
   generating the routing map based on the Q-values.

15. The computer implemented method of claim 14 and further comprising:
   detecting deployment of a new service endpoint; and
   computing the Q-learning algorithm for the new service endpoint.

16. The computer implemented method of claim 15 wherein computing the Q-learning algorithm for the new service endpoint comprises:
   identifying a threshold latency value based on latencies corresponding to service endpoints, other than the new service endpoint; and
   setting an initial Q-value for the new service endpoint based on the threshold latency value.

17. The computer implemented method of claim 16 wherein computing the Q-learning algorithm for the new service endpoint comprises:
   computing the Q-learning algorithm using the initial Q-value set for the new service endpoint.

18. The computer implemented method of claim 17 further comprising:
   receiving latency samples indicative of latency encountered at the client computing systems; and
   aggregating the latency samples to generate the set of latency data.

19. A computer system, comprising
   at least one processor; and
   a memory storing computer executable instructions which, when executed by the at least one processor, cause the at least one processor to implement:
      a learning system configured to perform a learning operation to generate a routing policy based on a set of latency data indicative of latency, corresponding to service requests, encountered at client computing systems, the set of latency data including more recent latency data and less recent latency data, the set of latency data being weighted in the learning operation to obtain weighted latency data so higher weights are assigned to the more recent latency data and lower weights are assigned to the less recent latency data; and
      a router configured to receive a DNS request, access the routing policy, and serve the DNS request by returning an internet protocol (IP) address of a service endpoint based on the routing policy.

20. The computer system of claim 19 wherein the learning system is configured to perform the learning operation by computing a model free reinforcement learning algorithm (Q-learning algorithm) using the weighted latency data, to obtain Q-values for each pair of client computing systems and service endpoints, and generate, as the routing policy, a routing map based on the Q-values.

* * * * *